United States Patent [19]
Schwesinger et al.

[11] Patent Number: 5,904,424
[45] Date of Patent: May 18, 1999

[54] DEVICE FOR MIXING SMALL QUANTITIES OF LIQUIDS

[75] Inventors: Norbert Schwesinger, Ilmenau; Thomas Frank, Hannover, both of Germany

[73] Assignee: Merck Patent Gesellschaft Mit Beschränkter Haftung, Germany

[21] Appl. No.: 08/930,362

[22] PCT Filed: Mar. 28, 1996

[86] PCT No.: PCT/EP96/01359

§ 371 Date: Sep. 30, 1997

§ 102(e) Date: Sep. 30, 1997

[87] PCT Pub. No.: WO96/30113

PCT Pub. Date: Oct. 3, 1996

[30] Foreign Application Priority Data

Mar. 30, 1995 [DE] Germany ............ 195 11 603

[51] Int. Cl.⁶ ........................... B01F 5/00
[52] U.S. Cl. ............ 366/336; 366/340; 138/42
[58] Field of Search .................. 366/341, 360, 366/339, 336, 337, 338; 422/81, 100; 436/52, 174, 179, 180; 435/288.4, 288.5; 204/450, 451; 138/127, 138, 140, 42

[56] References Cited

U.S. PATENT DOCUMENTS 3,701,619 10/1972 Appeldoorn et al. ............ 366/336
3,881,701 5/1975 Schoenman et al. ............ 366/340
4,572,435 2/1986 Thompson ............ 366/341
4,908,112 3/1990 Pace ............ 204/299 R
5,252,294 10/1993 Kroy et al. ............ 422/102
5,304,487 4/1994 Wilding et al. ............ 435/291
5,376,252 12/1994 Ekstrom et al. ............ 204/299 R
5,427,946 6/1995 Kricka et al. ............ 435/291
5,443,890 8/1995 Ohman ............ 428/167

FOREIGN PATENT DOCUMENTS

108063 8/1979 Japan .
96/04547 2/1996 WIPO .

*Primary Examiner*—Tony G. Soohoo
*Attorney, Agent, or Firm*—Millen, White, Zelano & Branigan, P.C.

[57] ABSTRACT

A device for mixing very small quantities of liquids comprises at least one mixing element with at least one inlet channel and at least one outlet channel; at least two microchannels issue from the inlet channel, all such issuing channels lying in a single branching plane. The microchannels are led to a confluence element in a plane which is rotated 90 degrees in relation to the branching plane. The mixer element is arranged in the planar surface of a substrate, the planar surface being hermetically sealed by a covering. The invention concerns a device for mixing liquids in which mixing is effected by the flow of the liquids to be mixed through narrow channels.

20 Claims, 10 Drawing Sheets

DEVICE FOR MIXING SMALL QUANTITIES OF LIQUIDS

The invention relates to a device for mixing liquids, in which the mixing takes place while the liquids to be mixed are flowing through narrow channels.

Devices for mixing liquids are known in the prior art in the form of static or dynamic mixers. Static mixers generally consist of pipe systems with internal fixtures. By utilizing the kinetic energy of a flowing liquid, it is homogenized after a specific flow path. Dynamic mixers have rotating mixing tools. These cause the mixing energy to enter the mixing product and bring about homogenization. Owing to the size of the equipment, mixers of this type can only be used for large quantities of liquid. However, the end or intermediate products occurring are often not required in this quantity.

By an extreme reduction in the reaction environment, attempts have been made to provide arrangements which enable mixing with little use of material. Such mixers operate as static mixers for the homogeneous mixing of small quantities of liquid according to the principle of the diffusion of liquid particles. In Proceedings $\mu$-TAS; Enschede 1994; pages 142–151; ISBN 0-7923-3217-2, a device is described, in which the liquids flow through narrow channels and become mixed by diffusion after correspondingly long flow paths. In these arrangements, the high pressure loss and low degree of efficiency have proved to be a disadvantage.

A further design of static mixers is described in Proceedings $\mu$-TAS; Enschede 1994; page 79. This arrangement has a large number of nozzles through which the liquids to be mixed are forced into one another. In these designs, too, the high pressure loss and the low degree of efficiency are a disadvantage.

Furthermore, mixers are known, which have a complicated shape of the channels, and in which, by means of internal fixtures, rotation and thus mixing of the liquid is to be brought about, a division of the liquid disadvantageously taking place after each mixing element and, after the following element, the division again leading to mechanical separation of the liquid (Proceedings $\mu$-TAS; Enschede 1994; pages 237–243). The known mixers for small quantities of liquid are either of very complicated construction or they have a very low degree of efficiency.

The invention is based on the object of specifying a device which can homogenize even very small quantities of liquids with high efficiency and is simple to manufacture.

According to the invention, the object is achieved in that
the device consists of at least one mixing element which has at least one inlet channel and at least one outlet channel,
at least two microchannels issue from the inlet channel, all the issuing channels lying in one branching plane,
the microchannels are led to a confluence element, the inflow being effected in one plane which is arranged rotated through 90° relative to the branching plane and
the mixing element is arranged in the planar surface of a substrate, the planar surface of the substrate being hermetically tightly sealed by a covering.

Advantageous refinements of the arrangement according to the invention are specified in the subclaims.

The device according to the invention is suitable for mixing very small quantities of liquid with a high efficiency and is distinguished by a very small construction size. Each element has at least two inlet channels for the liquids to be mixed. These channels can be arranged in a vertical or a horizontal plane. In the flow direction, these channels meet at a point, the confluence element. This is designed in such a way that, with a horizontal position of n inlet channels, n-outlet channels issue from this confluence in n different vertical planes respectively. If the n inlet channels lie in a vertical plane, n outlet channels issue from said confluence in a horizontal plane. The outlet channels, in turn, then form the inlet channels for the following mixing element. The overall arrangement consists of a large number, but of at least two, interconnections of these elements. Mixing of the liquids is achieved in that, for example, two liquids flowing in horizontal flow channels meet one another at the confluence in such a way that a vertical boundary layer develops between the two liquids. Two outlet channels then issue from this confluence in two planes disposed perpendicular to one another. This brings about a vertical separation of the overall flow. A first part-flow flows in a first plane. The second part-flow flows in a second plane. Before the next confluence is reached, the two part-flows are guided in one plane again. At the confluence, a liquid flow thus develops, which has four liquid layers with three boundary layers. Outlet channels also issue from this confluence, again arranged perpendicularly. Again these open in one plane in the next confluence. At this confluence, the number of boundary layers in the liquid is seven.

The outlet channels are designed in each case in such a way that the flow path of the liquids is equally long or the flow resistance is of equal magnitude. The elements are manufactured using microstructurable materials. They can be arranged one after another or one above another. The following elements can be arranged rotated through any desired angle, preferably through 90°, relative to the preceding element.

The invention is explained in greater detail below with reference to an exemplary embodiment. In the associated drawing.

Figure 1A:
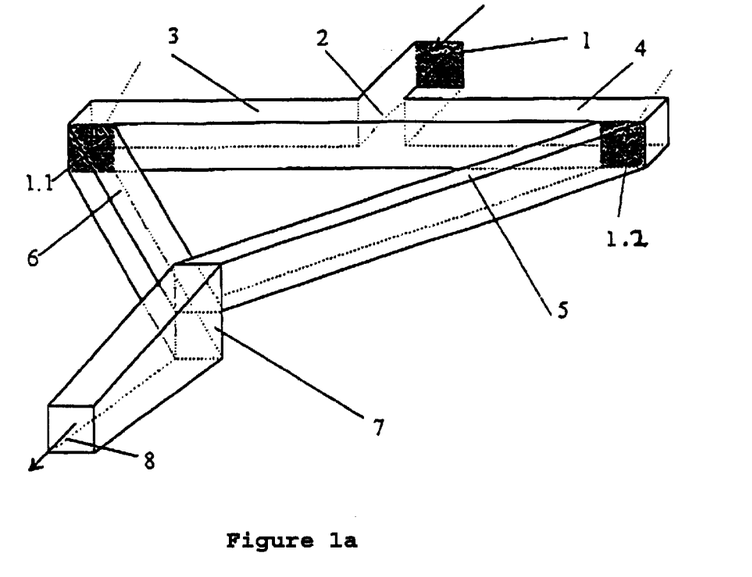
FIG. 1a shows the basic arrangement of a mixing element for vertical separation and horizontal layering of the liquids one above another.

FIG. 1a diagrammatically illustrates the basic arrangement of a mixing element. In the case of this mixing element, the liquid to be homogenized is conducted into the mixing element through a microchannel at the inlet 1. This microchannel has a bifurcation 2 from which the microchannels 3 and 4 issue. The bifurcation 2 brings about a separation of the liquid along an imaginary vertical line. The mixing elements may be arranged one after another several times over. For mixing elements which are arranged at the beginning, the inflow of the liquids to be mixed takes place through the cross-sectional areas 1.1 and 1.2. The inlet 1, the cross-sectional areas 1.1 and 1.2, the bifurcation 2 and the microchannels 3,4 are located in a horizontal plane. The following microchannels are arranged in such a way that microchannel 6 departs from this plane. The microchannel 5 remains in the horizontal plane. The microchannels 5 and 6 are arranged in such a way that they meet again in a confluence element 7, the two microchannels 5 and 6 being located in different planes. The liquids flowing out of the microchannels 5 and 6 thus undergo layering one above another at the confluence element 7 along an imaginary horizontal line. After the liquids have passed through the confluence element 7, they flow into a further microchannel 8. This microchannel 8 forms in its shape a new inlet for a following mixing element or, in the case of being the last mixing element, leads to the outlet of the micromixer.

Figure 1B:
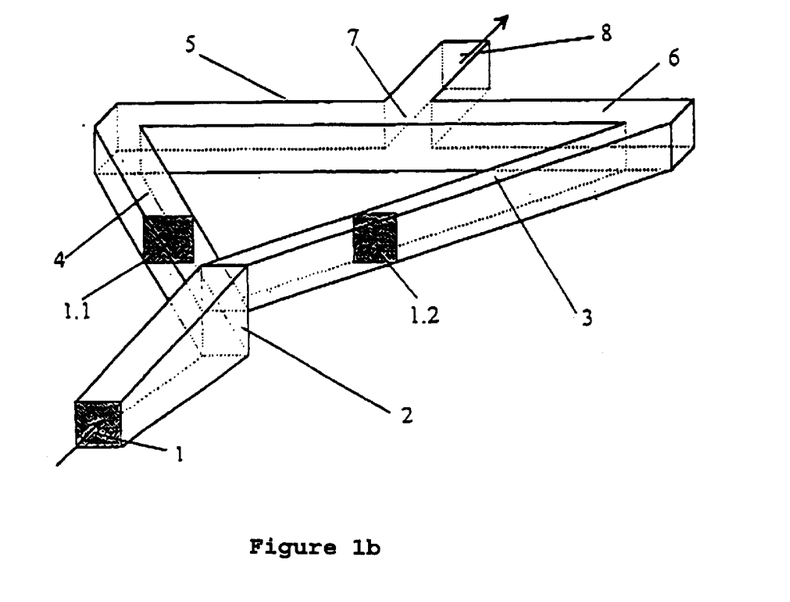
FIG. 1b shows a basic arrangement of a mixing element for horizontal separation and adjacent vertical layering of the liquids.

FIG. 1b illustrates the diagrammatic basic arrangement of a mixing element, in which the liquid to be homogenized is conducted into the mixing element through a microchannel at inlet 1. This microchannel opens into the bifurcation 2 from which the microchannels 3 and 4 issue. In the bifurcation 2, the liquid is separated along an imaginary horizontal line. For mixing elements which are arranged at the beginning, the inflow of the different liquids takes place through the cross-sectional areas 1.1 and 1.2. In the case of this mixing element, the inlet 1, the cross-sectional areas 1.1 and 1.2 and the microchannels 3 and 4 are located in two horizontal planes. The bifurcation- 2 connects the two horizontal planes through a shaped opening. In the further course of the microchannels, one of the microchannels 4 departs from the horizontal plane while the microchannel 3 remains there. The mixing channels 5 and 6 are arranged in such a way that they meet again in the confluence element 7. Since, however, both microchannels 5 and 6 lie in the same horizontal plane, the liquids flowing out of the microchannels 5 and 6 undergo adjacent layering at the confluence element 7 along an imaginary vertical line. A further microchannel 8 is arranged downstream of the confluence element 7. This microchannel forms in its shape a new inlet for a following mixing element or, in the case of being the last mixing element, leads to the outlet of the micromixer.

Figure 2:
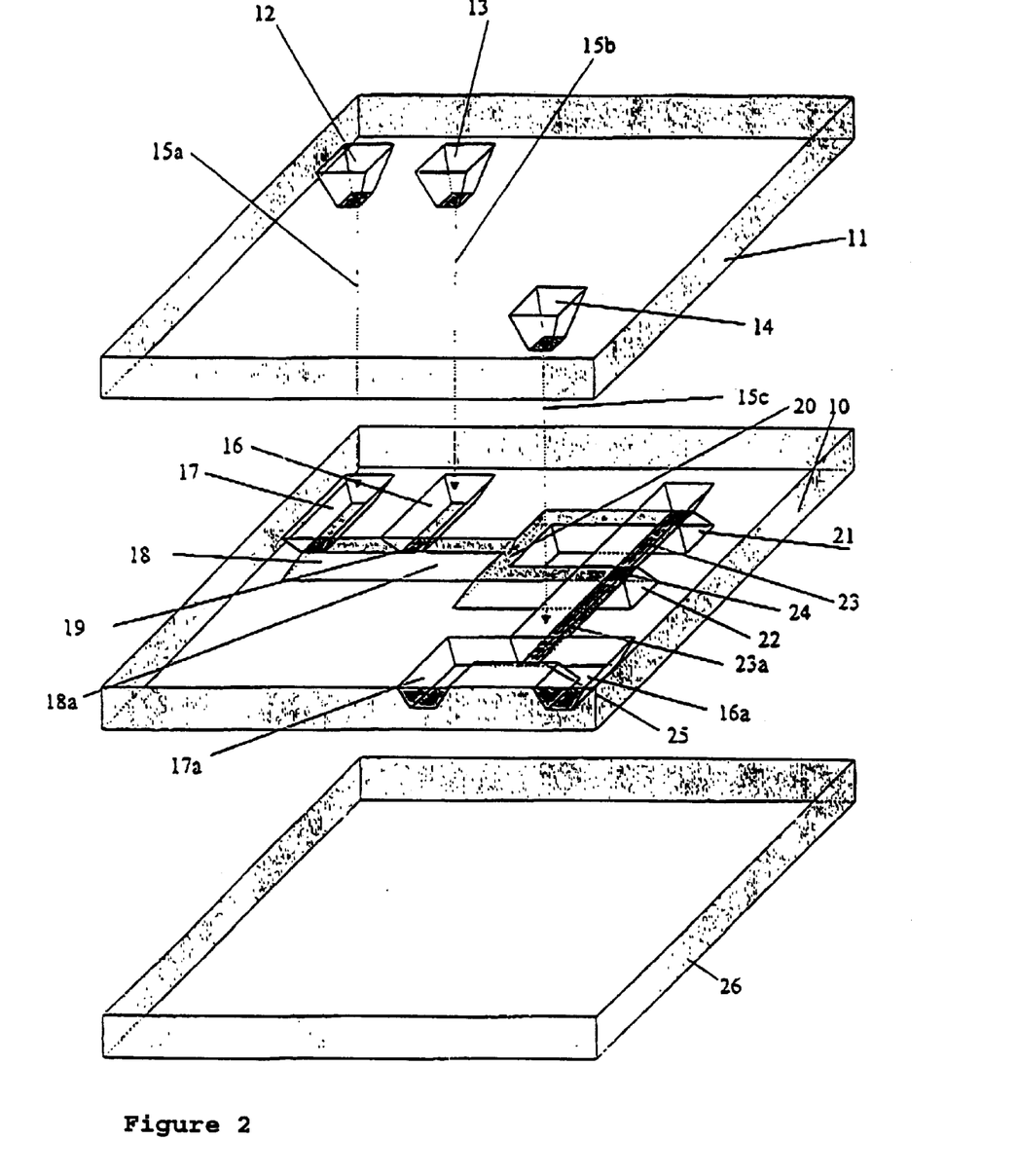
FIG. 2 shows the front view of a mixing element with an inlet substrate plate, a structured substrate plate and a covering plate.

FIG. 2 illustrates a mixing element which is located in a planar substrate 10. A further substrate 11 is arranged on the top side of the substrate 10. The substrate 11 contains the inlets 12 and 13 into the mixing element and the outlet 14 out of the mixer. Any desired number of mixing elements may be arranged in the substrate 10. The position of the inlets 12 and 13 and of the outlet 14 in relation to the position of the mixing elements are [sic] illustrated by arrows 15a, 15b and 15c. In this case, in the first mixing element of a micromixer, the inlets 12 and 13 are positioned on the substrate 11 in such a way that they are directly connected to the microchannels 16 and 17 of the substrate 10. The substrates 10 and 11 are connected to one another in a hermetically sealed manner. The microchannels 16 and 17 are arranged adjacently in the substrate 10. The liquids fed through the microchannels 16 and 17 are conducted one above the other in the microchannel 18. The liquid flows coming out of the two microchannels 16 and 18 meet again at the connection 19, the liquid flow from microchannel 16 lying in a different horizontal plane at this junction than the liquid flow from microchannel 18. Starting from the connection 19, the liquid flow from microchannel 18a continues in the second plane of the substrate 10 up to the bifurcation 20. Two microchannels 21 and 22 again issue from the bifurcation 20, so that the liquid flow starting from the microchannel 22 remains in the second horizontal plane of the substrate 10, whereas the second liquid flow starting from microchannel 21 departs from this horizontal plane and opens [sic] into a microchannel 23 in the first horizontal plane of the substrate 10. The two liquid flows from the microchannels 22 and 23 which are located in different horizontal planes of the substrate 10 meet again at the connection 24, the liquid flow coming from channel 22 lying in a different horizontal plane at this connection 24 than that from channel 23. Issuing from the connection 24, the microchannel 23a continues in the first plane of the substrate 10 up to the bifurcation 25. At this bifurcation 25, two liquid flows from the microchannels 16a, 17a are again formed. The microchannels 16a and 17a are the inlet channels for a further mixing element. In the case of being the last mixing element, an opening is arranged in the substrate 11 in such a way that it is directly connected to the channel 23a in the substrate 10. The entire substrate 10 on which the structures of all the mixing elements are located is hermetically tightly sealed on the underside by a further substrate 26.

Figure 3:
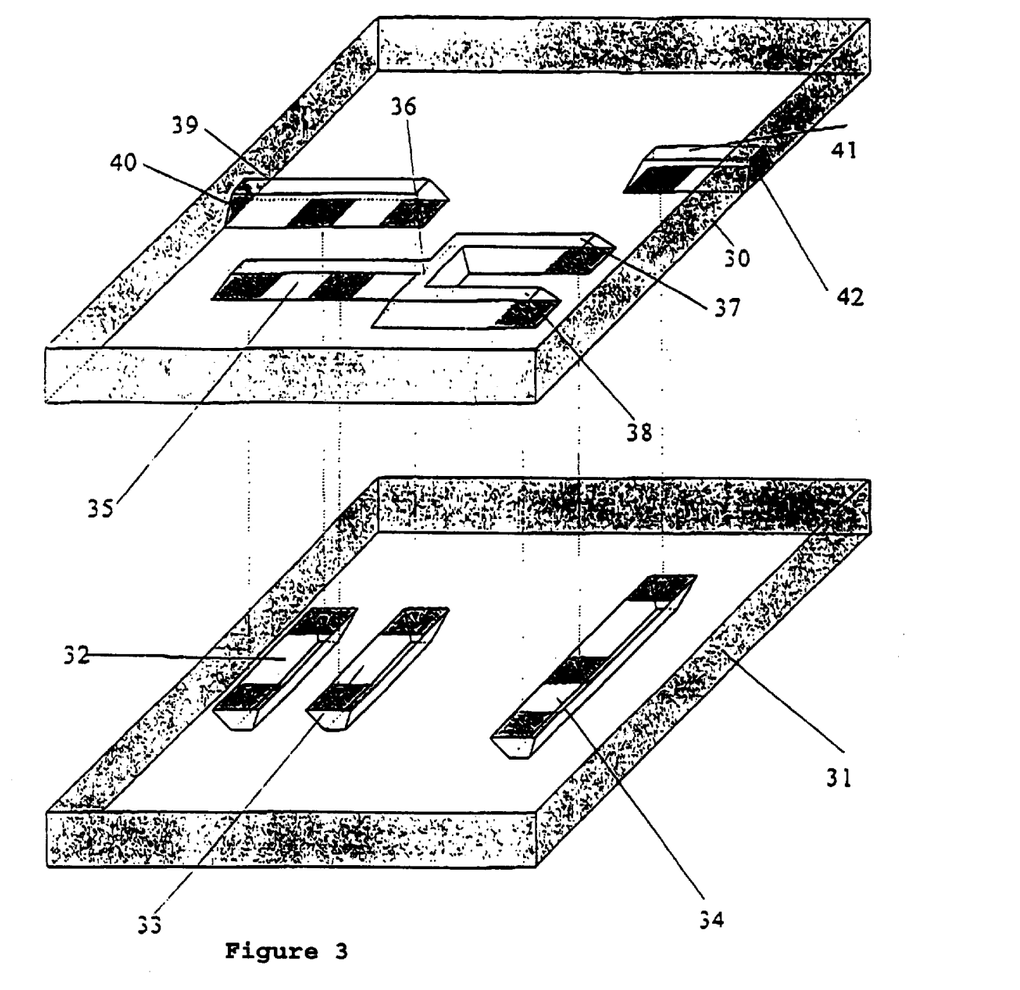
FIG. 3 shows the front view of a mixing element consisting of two structured substrates.

A further embodiment of the mixing element is shown in FIG. 3. The mixing element is implemented by two substrates 30 and 31 which are hermetically tightly connected to one another. Microchannels 32, 33 and 34 are formed in the top side of the substrate 31 which is a horizontal plane. Each of these channels is isolated from the other channels 32, 33 and 34 in the substrate 31. A microchannel structure which has different sections is likewise formed in the underside of the substrate 30 which is a further horizontal plane. In the first section 35, the microchannel is shaped to be straight. A bifurcation 36 adjoins this section. Issuing from this bifurcation 36, two new microchannels 37 and 38 are formed. In this case, the microchannels of the substrate 30 are assigned to the second substrate 31 in such a way that the ends of the microchannels 32, 33 come into direct contact with the channel 35. Furthermore, the ends of the microchannels 37, 38 are arranged in such a way that covering with the microchannel 34 of the second substrate 31 is possible.

Located in the underside of the substrate 30 is a microchannel 39 which covers the ends of the channels 32 and 33 in the substrate 31. This microchannel 39 has an entry surface 40 for the liquids to be mixed. The outlet of the mixing element is formed by the microchannel 41 with the exit surface 42.

Figure 4:
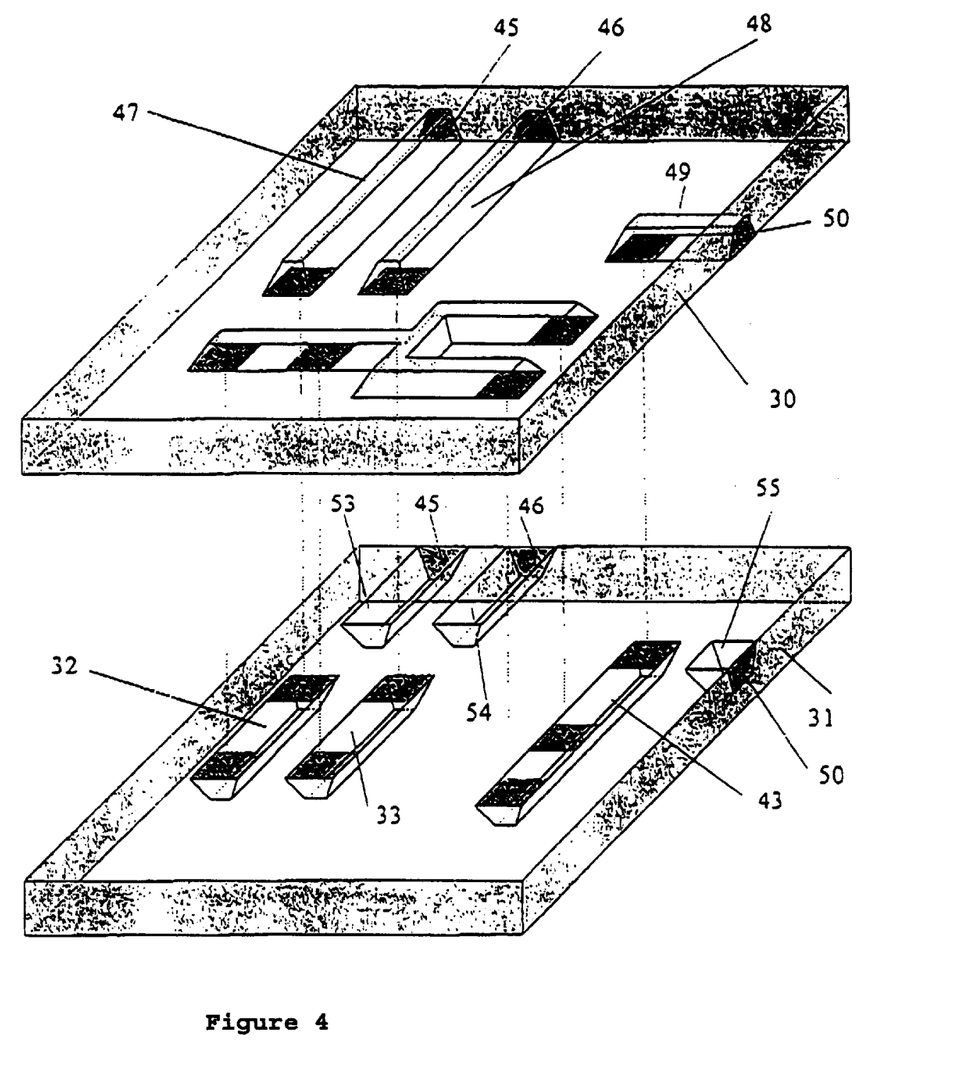
FIG. 4 shows the front view of a mixing element consisting of two structured substrates and the lateral arrangement of the inlets and outlets of the mixing element.

An expedient arrangement of the liquid entries and liquid exits is shown in FIG. 4. Located in the first substrate 30 are the microchannels 47 and 48 which cover the microchannels 53 and 54 in the second substrate 31 over their entire width and whose ends likewise cover the microchannels 32 and 33 of the substrate 31. Together with the microchannels 47 and 48 of the first substrate 30, the microchannels 53 and 54 of the second substrate 30 form entry surfaces 45 and 46 for the liquids to be mixed. The liquid exit is formed by the covering of the microchannel 49 in the first substrate 30 and the microchannel 55 in the second substrate 31. By means of this covering of the two microchannels 49 and 55, a common exit surface is obtained. There is no illustration of the fact that, for fluid contacting, capillary tubes which are sealed off at their circumference from the substrates 30 and 31 can also be pushed through the entry surfaces 45 and 46 and the exit surfaces 50.

Figure 5:
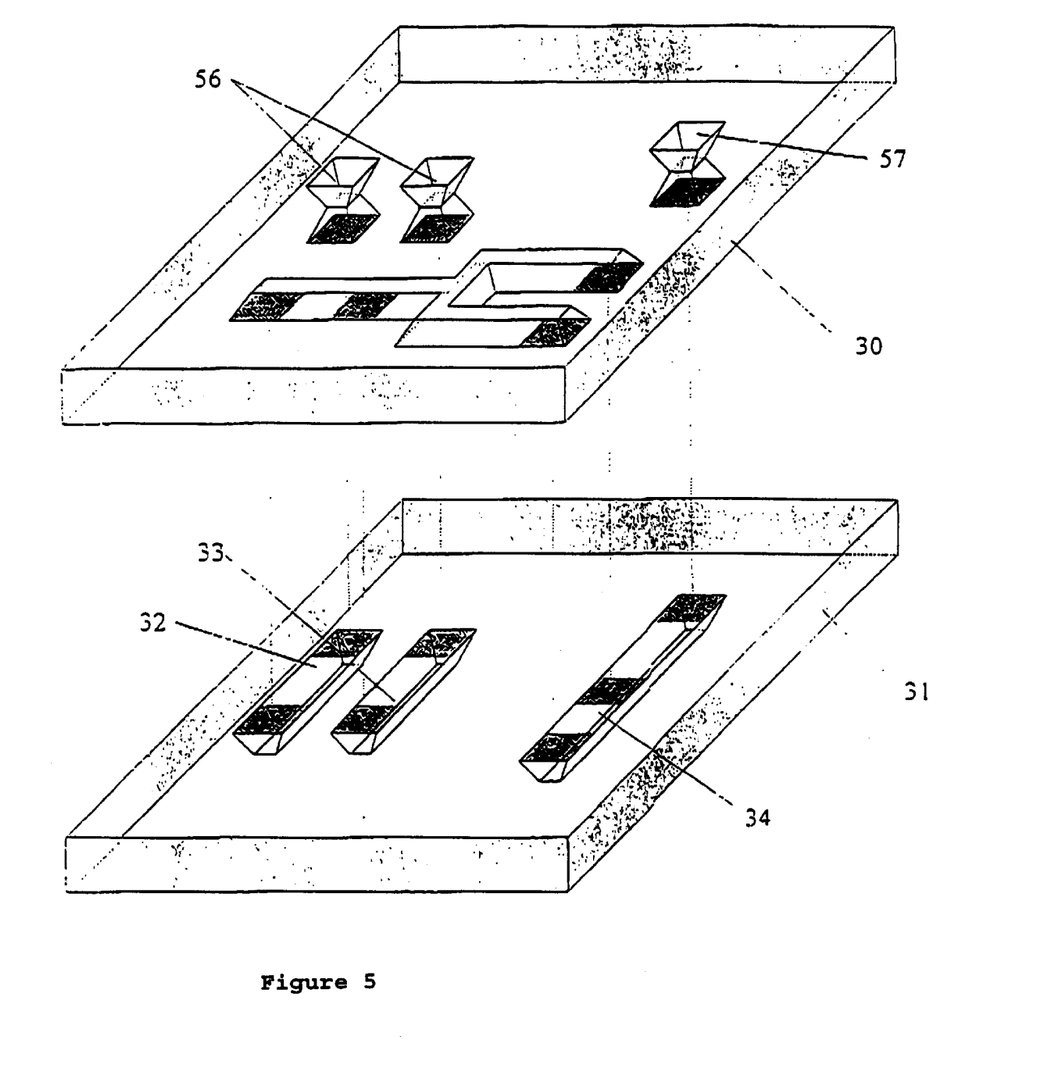
FIG. 5 shows the front view of a mixing element consisting of two structured substrates and the arrangement of the inlets and outlets of the mixing element in the upper substrate plate.

A further possibility of exterior fluid contacting of the micromixing elements is illustrated in FIG. 5. The substrate 30 has shaped openings 56 which cover the ends of the microchannels 32 and 33 in the substrate 31. These openings are designed in such a way that inflow of the liquids to be mixed into the mixing element is possible. The outlet of the mixing element is likewise formed by an opening 57 in the substrate 30. In this case, said opening 57 is arranged in such a way that it covers the end of the microchannel 34 in the substrate 31. There is no illustration of the fact that tubes are arranged on the surface of the substrate 30, the entry cross section of said tubes being arranged parallel to the surface of the substrate.

Figure 6:
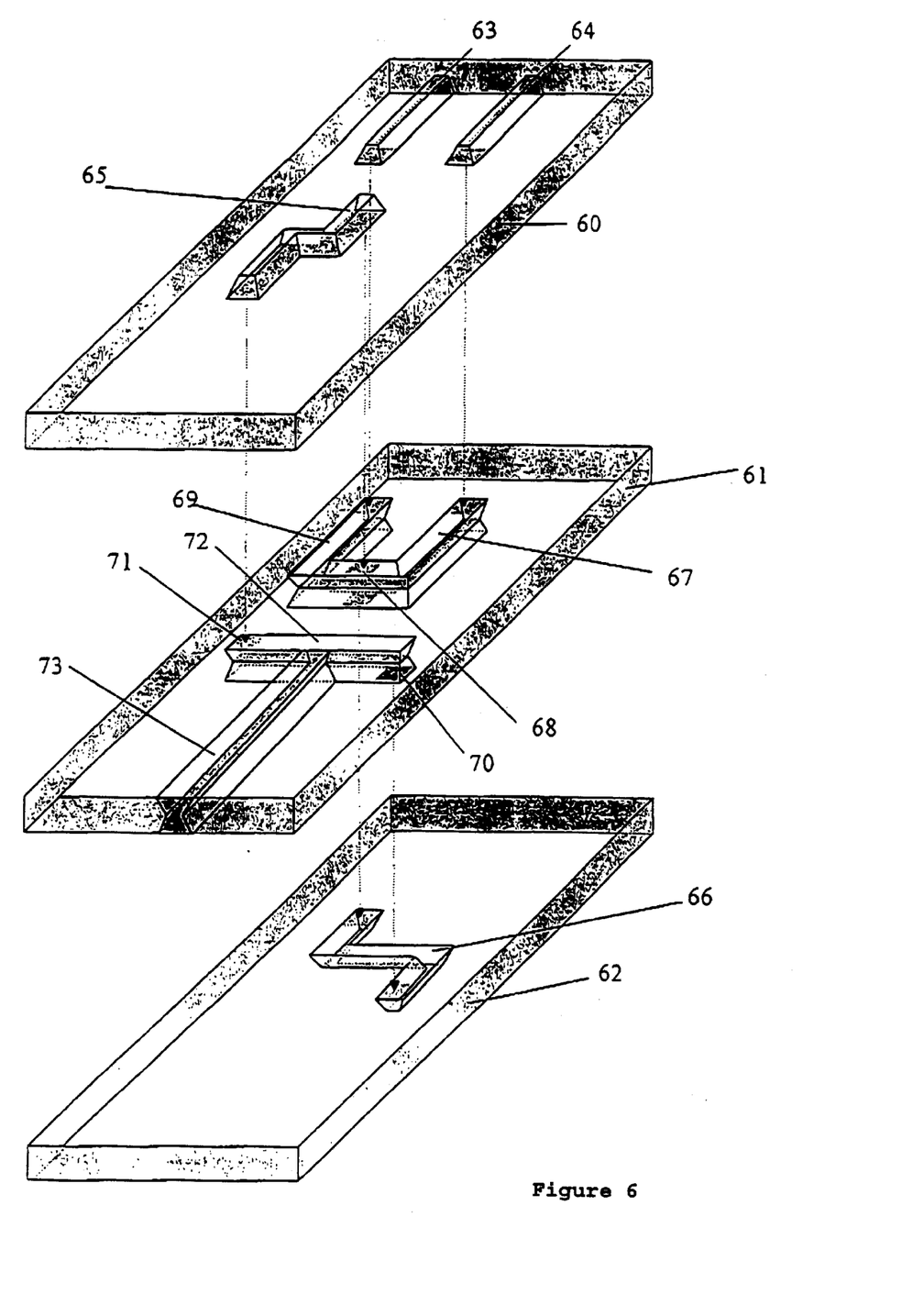
FIG. 6 shows the front view of a mixing element consisting of three structured substrate plates.

In a further exemplary embodiment according to FIG. 6, a mixing element is shown, which is made up of a total of three substrates. The inflow channels 63 and 64 are located in a first substrate 60. The ends of said inflow channels are arranged in the flow direction to two microchannel sections 67 and 69 in the second substrate 61 in such a way that covering occurs. The microchannel sections 67 and 69 open into a confluence element 68. The confluence element 68 is covered on its top side by the microchannel 65 of the substrate 60 and on its underside by the microchannel 66 of the third substrate 62. The microchannels 65 and 66 are shaped in such a way that, viewed in the flow direction, they are congruent with the microchannel sections 70 and 71 in the second substrate 61. The microchannel sections 70 and 71 open into a confluence element 72. Issuing from this point is a new microchannel 73 which connects the mixing element to further mixing elements.

Figure 7:
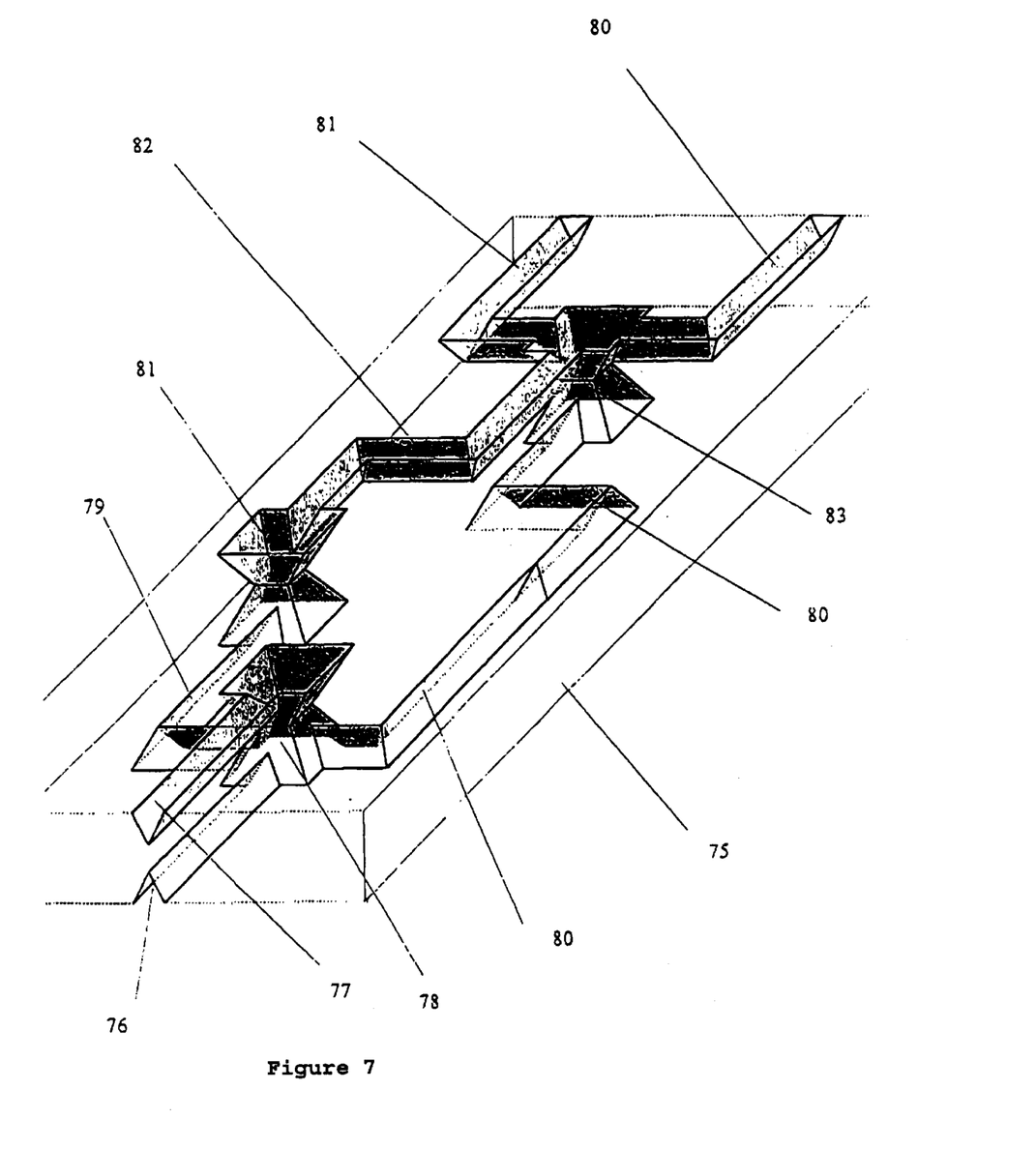
FIG. 7 shows the front view of a mixing element consisting of all the structures in a substrate.

FIG. 7 shows a mixing element in which all the structures are located on a substrate 75. The inlet channel 77 for a liquid is arranged in the upper plane of the substrate 75. Located in the lower plane of the same substrate 75 is the inlet channel 76 for a second liquid. Both microchannels open into a confluence element 78 which is designed in such a way that two new microchannels 79 and 80 issue in the lower plane of the substrate. In this case, the confluence element 78 is designed in such a way that it connects the upper and the lower plane of the substrate 75 to one another. One of the microchannels 80 remains in its further course in the lower plane of the substrate 75. The second microchannel 79 opens into an opening 81 between the upper and the lower plane of the substrate 75. Issuing from this opening 81 is a new microchannel 82 in the upper plane of the substrate 75, which finally again opens into a confluence element 83 which is of similar design to the confluence element 78. Again two microchannels 80 and 81 issue from this confluence element 83 in the upper plane of the substrate. In this case, the dashed line defines the end of a mixing element and the transition to a new mixing element. The inlets 76 and 77 can be used to operate the mixing elements. In this case, the outlets are formed by the channels 80 and 81. It is likewise possible to design the channels 80 and 81 as inlets of the mixing element. In this case, the outlet of the mixing element is formed by the channels 76 and 77.

Figure 8:
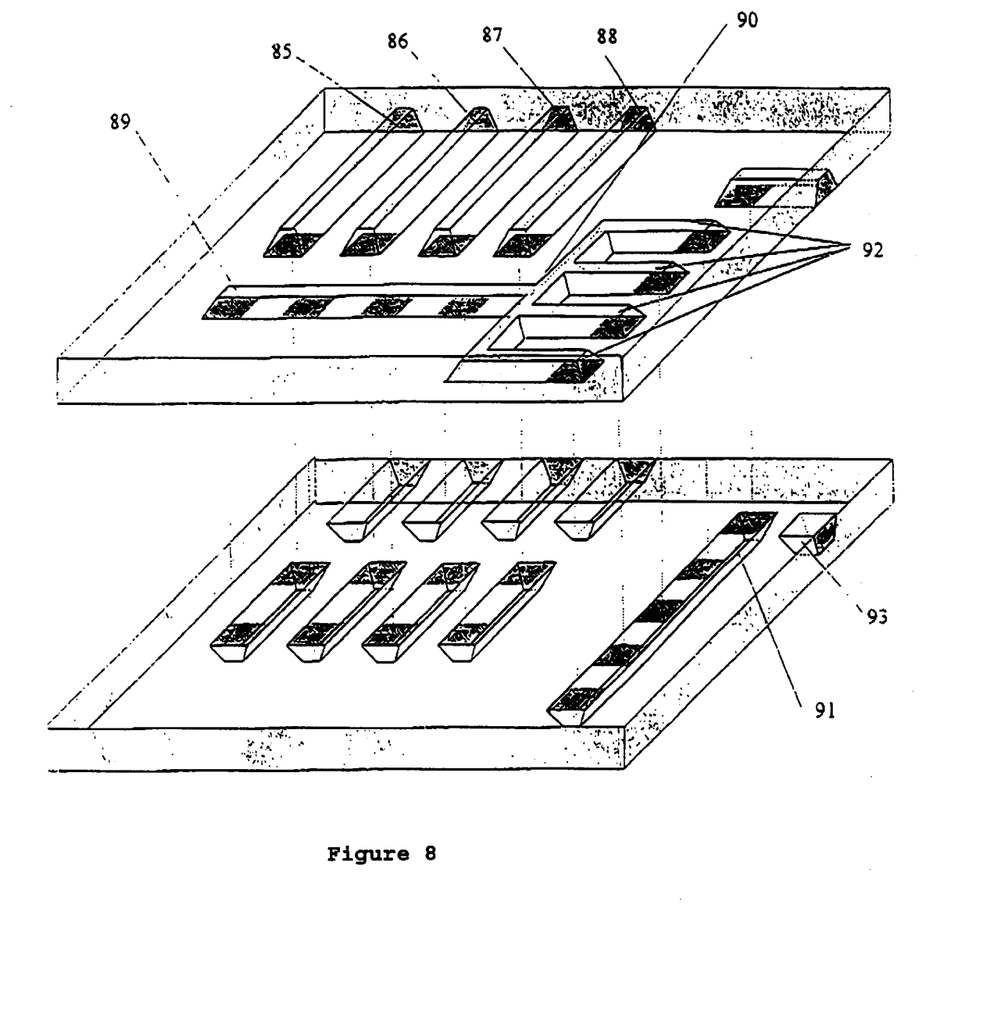
FIG. 8 shows the front view of a mixing element for mixing more than two fluids consisting of two structured substrate plates and laterally arranged liquid inlets and outlets.

FIG. 8 shows a mixing element that is suitable for mixing more than two different liquids. The microchannels 85, 86, 87 and 88 are designed for the liquid entry. These channels are connected to one another in such a way that layering of the individual liquids one above another is inevitably brought about in the microchannel 89. At the branching point 90, the microchannel is divided into the same number of microchannels 92 as are formed at the liquid entry. The microchannels 92 are connected to one another at their ends by the microchannel 91. The exit is formed by the microchannel 93.

Figure 9:
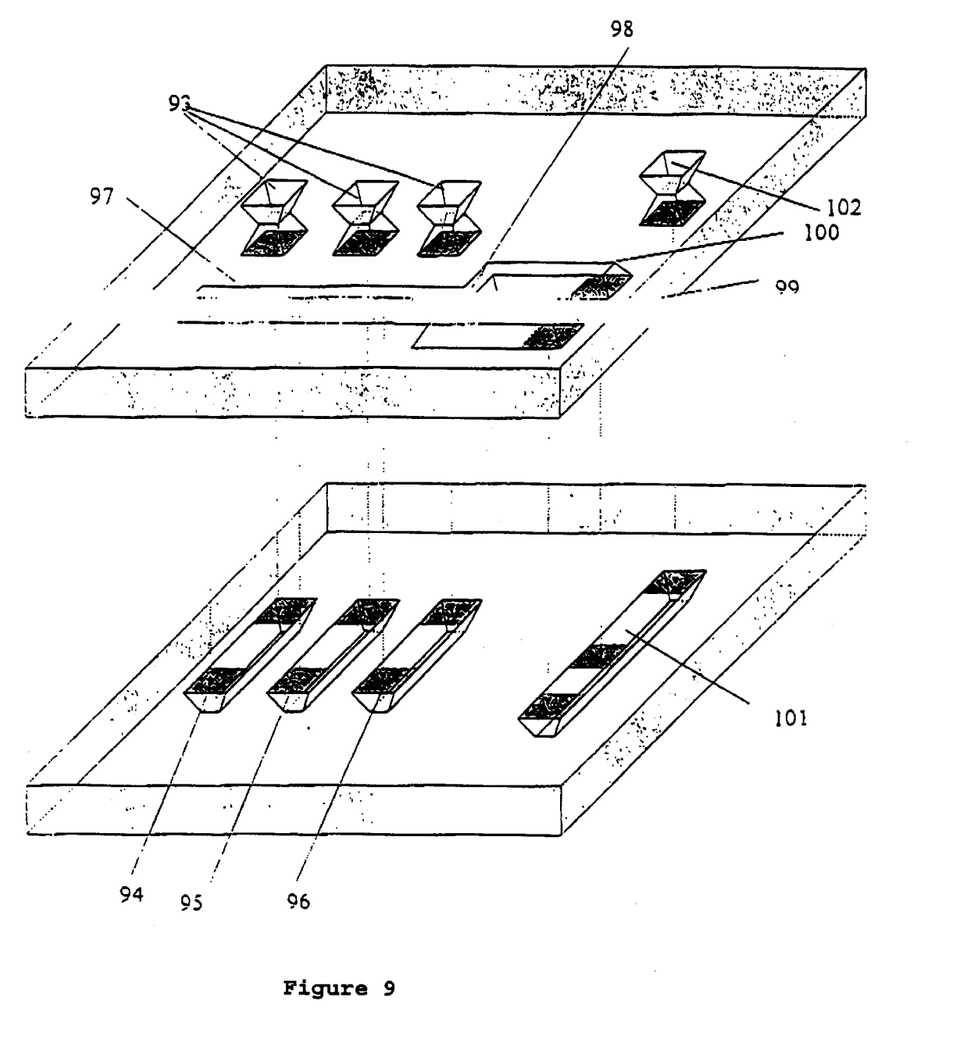
FIG. 9 shows the front view of a mixing element for mixing more than two fluids consisting of two structured substrate plates and liquid inlets and outlets which are arranged in the upper substrate.

FIG. 9 shows a further possibility for mixing more than two different liquids. The liquid entries 93 are connected to the microchannels 94, 95 and 96 in the second plane of the mixing element. The microchannels 94, 95 and 96 open at their ends into the channel 97 in the first plane of the mixing element. Located at its one end is a branching point 98 from which at least two, here the microchannels 99 and 100 [lacuna] in the second plane of the mixing element. An exit 102 from the mixing element is arranged at one end of the microchannel 101.

Figure 10:
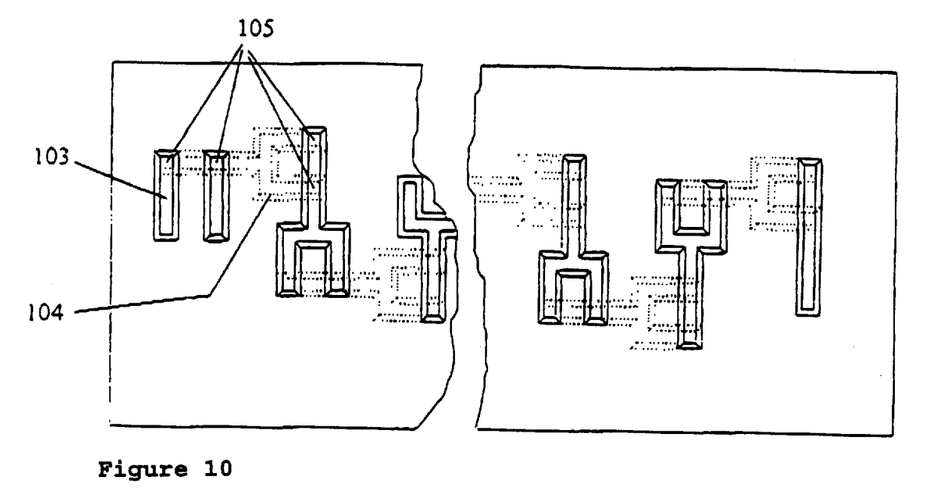
FIG. 10 shows the plan view of a possible connection of a plurality of mixing elements of an arrangement one behind the other with three substrates.
Figure 11:
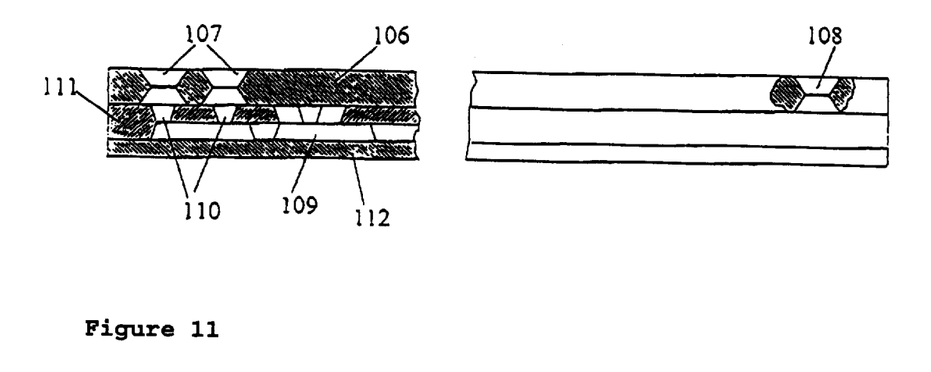
FIG. 11 shows the sectional illustration of the arrangement 10.

FIG. 10 shows the plan view of an interconnection of a plurality of mixing elements. For reasons of clarity, the upper substrate was not illustrated. The solid lines 103 show the structure of the microchannels in the first plane. The structure of the second plane is represented by dashed lines 104. Openings between the planes are located at the covering points 105 of the structures of the two planes. FIG. 11 shows a sectional illustration of FIG. 10, the covering substrate 106 with the entry openings 107 and an exit opening 108 being illustrated. The channel structures 109 and the openings 110 in the substrate 11 are clearly visible. The underside of the structured substrate 111 is covered by a further substrate 112.

We claim:

1. A device for mixing liquids, wherein mixing is effected by the flowing of the liquids through narrow channels, said device comprising:

at least one mixing element having at least one inlet channel and at least one outlet channel, wherein said mixing element is arranged on at least one substrate having planar surface;

at least two microchannels issuing from said inlet channel, said at least two microchannels lying in a same branching plane;

a confluence element being connected by a connection to said microchannels, wherein the connection effects a 90° rotation of the inflow of the liquid relative to said branching plane as the liquid flows from said microchannels to said confluence element;

said at least one outlet channel being connected to said confluence element; and a covering hermetically sealing the planar surface of said at least one substrate to cover the mixing element.

2. The device according to claim 1, wherein said at least one outlet channel is in a plane parallel to a plane of the inlet channels; and, said device further comprising one or more opening through which said at least one outlet channel is fed back into said plane of said at least one inlet channel.

3. The device according to claim 2, wherein said microchannels and said openings are produced by chemical etching processes, laser etching, photo-etching, or sand blasting.

4. The device according to claim 2, wherein said confluence element comprises one or more openings issuing to a connecting channel on a following plane; and, wherein additional channels issue from said connecting channel for mixing.

5. The device according to claim 1, wherein said confluence element comprises one or more opening issuing to a connecting channel on a following plane; and, wherein additional channels issue from said connection channel for mixing.

6. The device according to claim 1, wherein all of said outlet channels issuing from said confluence element have substantially the same flow resistance.

7. The device according to claim 6, wherein two or more of said mixing elements are arranged successively in one plane, and wherein each mixing element is rotated relative to a preceding mixing element.

8. The device according to claim 1, wherein two or more of said mixing elements are arranged successively in one plane, and each mixing element is rotated relative to a preceding mixing element.

9. The device according to claim 8, wherein each mixing element is rotated 90° relative to a preceding mixing element.

10. The device according to claim 8, further comprising an intermediate layer between raid substrates and openings for connection between said substrates.

11. The device according to claim 1, wherein said covering consists of silicon or glass.

12. The device according to claim 1, wherein said microchannels are located on a separate substrate from said confluence element.

13. The device according to claim 1, further comprising an intermediate layer between said substrates and openings for communication between said substrates.

14. The device according to claim 1, wherein said one or more substrate is comprised of single-crystalline silicon or etchable glass etched by microscopic techniques.

15. A device for mixing liquids having multiple substrates with planar surfaces, comprising:

one or more mixing element, each mixing element comprising at least one inlet channel and at lease one outlet channel;

two or more microchannels issued from said inlet channel, said microchannels being coplanar on a first substrate and conducting liquid flow in a first plane parallel to said first substrate;

a confluence element lying on a second substrate;

openings on said first substrate and said second substrate;

said confluence element being connected to said microchannels via said openings; wherein said openings provide a perpendicular rotation of the inflow of the liquids relative to said first plane as the liquid flows from said first substrate to said second substrate; and said outlet channel being connected to said confluence element;

whereby the inflow of the liquids through said inlet channel, said microchannels, said openings, said confluence element, and said outlet channel results in homogenized liquids at said outlet of said outlet channel.

16. The device as claimed in claim 15, said device comprising an interconnection of a plurality of said mixing elements, wherein said outlet of one element becomes said inlet of a following mixing element.

17. The device as claimed in claim 16, further comprising a covering to hermetically seal a planar surface of one of said substrate.

18. The device as claimed in claim 16, further comprising an intermediate layer between said substrates, said intermediate layer comprising openings for conducting the liquids from one substrate to another.

19. The device as claimed in claim 16, wherein all of said outlet channels have substantially same flow resistance.

20. The device as claimed in claim 15, wherein all of said outlet channels have substantially same flow resistance.

* * * * *